US008641800B2

(12) United States Patent
McMahon

(10) Patent No.: US 8,641,800 B2
(45) Date of Patent: Feb. 4, 2014

(54) METHOD OF ALLOYING VARIOUS GRADES OF STEEL WITH MANGANESE OXIDES

(75) Inventor: Joseph Boston McMahon, Marietta, OH (US)

(73) Assignee: Joseph B. McMahan, Marietta, OH (US)

( * ) Notice: Subject to any disclaimer, the term of this patent is extended or adjusted under 35 U.S.C. 154(b) by 30 days.

(21) Appl. No.: 13/169,696

(22) Filed: Jun. 27, 2011

(65) Prior Publication Data

US 2012/0325054 A1 Dec. 27, 2012

(51) Int. Cl.
*C22B 9/00* (2006.01)
*C21B 7/14* (2006.01)

(52) U.S. Cl.
USPC .............................. 75/582; 75/10.46; 75/331

(58) Field of Classification Search
USPC ....................................... 75/582, 331, 10.46
See application file for complete search history.

(56) References Cited

U.S. PATENT DOCUMENTS

| 2,746,857 | A | | 5/1956 | Wright |
| 2,830,891 | A | * | 4/1958 | Udy ............................. 75/10.53 |
| 3,964,899 | A | * | 6/1976 | Jones et al. ...................... 75/309 |
| 4,537,629 | A | | 8/1985 | Lazcano-Navarro et al. |
| 4,576,638 | A | | 3/1986 | Doerr et al. |
| 4,613,363 | A | * | 9/1986 | Wienert ....................... 75/10.62 |
| 4,662,937 | A | | 5/1987 | Katayama et al. |
| 7,998,243 | B2 | | 8/2011 | Rose et al. |
| 2011/0094336 | A1 | | 4/2011 | Spitzer et al. |

OTHER PUBLICATIONS

International Search Report and Written Opinion of the International Application No. PCT/US2012/042202, filed Jun. 13, 2012.

* cited by examiner

*Primary Examiner* — Rebecca Lee
(74) *Attorney, Agent, or Firm* — Baker & Hostetler LLP

(57) ABSTRACT

A method of alloying an iron majority compound with an oxide is provided. The method may include: heating the iron majority compound to a molten state; adding an oxide containing manganese to the molten iron majority compound; adding slag forming materials and reducers to the molten iron majority compound; controlling the iron majority compound to achieve a desired temperature environment for a desired period of time; and removing slag from the iron majority compound.

12 Claims, 5 Drawing Sheets

METHOD OF ALLOYING VARIOUS GRADES OF STEEL WITH MANGANESE OXIDES

FIELD OF THE INVENTION

The present invention relates generally to a method of making a steel manganese alloy. More particularly, the present invention relates to refining steel and manganese together.

BACKGROUND OF THE INVENTION

Currently, various grades of steel are produced by using ferroalloys as an alloying material. Generally, the ferroalloy is produced in a completely separate operation and often at a separate facility then the production of iron. The iron and ferroalloys are then brought together and combined to produce manganese steel.

The use of ferroalloys requires separate furnace operation and energy expenditures. The use of ferroalloys also leads to an inefficient recovery of manganese from the ores, or oxide materials, that are used to produce ferroalloys. Ferroalloy production occurs with high losses of manganese in the slag, or impurity containing material and as gaseous or fume loss.

The use of ferroalloys allows steel alloying to occur with an alloying element containing an increased manganese concentration compared to that of most manganese containing oxide materials. By using a ferroalloy converted from an oxide material there is less likelihood of non-metallic inclusions being present in the final product using current production methods.

Currently, high volume ferroalloys are produced by the reduction of manganese containing ores in a high temperature furnace. This produces a metallic manganese containing compound and a byproduct slag volume, or waste containing the impurities. If silicon use is kept to a minimum during the reduction the slag volume is roughly three times that of the metallic. In common SiMn and FeMn production the manganese content of the slag can range from ten to forty percent. Although the slag can be in essence reused to create a metallic it requires the use of additional compounds and energy use. The process of reusing slag is not as efficient as the initial reduction from a material and energy standpoint.

Current steelmaking can be broken down into several steps: iron refining, alloying, and conversion. Iron refining involves taking a raw iron source, usually iron ore- or scrap metal and heating in a furnace (blast furnace but could be oxygen enriched or electric reduction). This process results in a majority iron containing compound and a byproduct slag.

In alloying and conversion the necessary alloys are added to the iron source in a reduction furnace. This is the step at which currently ferroalloys are added to the steelmaking process. Once the conversion has occurred the final product is kept and the resulting slag, or impurities, is removed. During the conversion the impurities and desired compounds are reacted into compounds that will be left in the slag leaving the iron based alloy as the final product.

Accordingly, it is desirable to provide a method that combines the production of iron and manganese to result in a manganese steel.

SUMMARY OF THE INVENTION

The foregoing needs are met, to a great extent, by the present invention, wherein in one aspect an apparatus is provided that in some embodiments a method is provided that combines the production of iron and manganese to result in a manganese steel.

In accordance with one embodiment of the present invention, a method of alloying an iron majority compound with an oxide is provided. The method may include: heating the iron majority compound to a molten state; adding an oxide containing manganese to the molten iron majority compound; adding slag forming materials and/or reducer/s to the molten iron majority compound; controlling the iron majority compound to achieve a desired temperature for a desired period of time; and removing slag from the iron majority compound.

In accordance with another embodiment of the present invention, a method of alloying an iron majority compound may be provided. The method may include: heating iron containing material to form molten iron; adding manganese containing materials to the molten iron to form a mixture wherein the manganese containing materials include manganese oxide; continuing to heat the mixture; removing slag from the mixture; subjecting the mixture to a controlled heating environment; and removing slag from the mixture.

In accordance with yet another embodiment of the present invention, a method of alloying iron and manganese is provided. The method may contain: heating iron containing material to form molten iron; removing slag from the molten iron; subjecting the molten iron mixture to a controlled heating environment; and remove slag from the mixture.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 2:
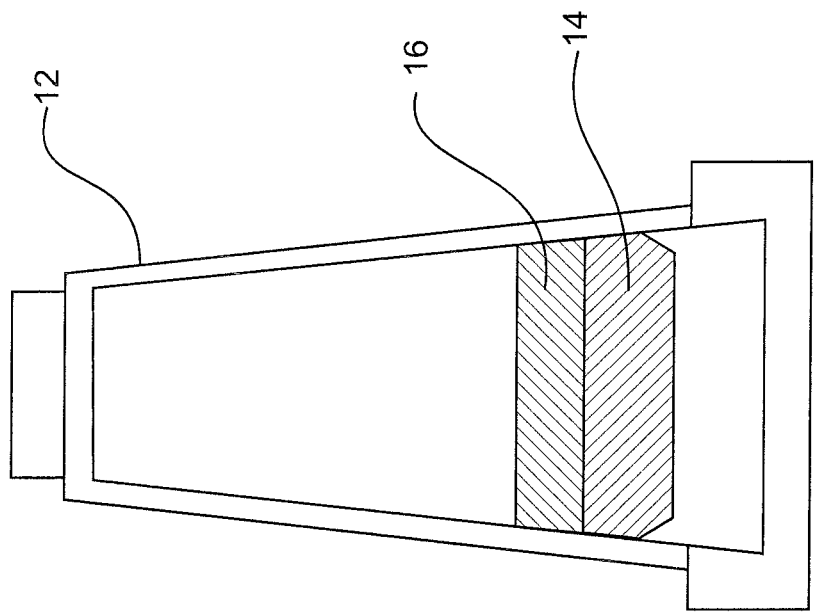
FIG. 2 is a schematic cutaway side view of a furnace used in accordance with an embodiment of the invention.

The invention will now be described with reference to the drawing figures, in which like reference numerals refer to like parts throughout. An embodiment in accordance with the present invention provides a method to create various grades of manganese alloyed steel while using a less costly process that utilizes oxide materials containing manganese more efficiently than currently used methods.

Some embodiments will also create a product containing fewer non-metal inclusions thus enhancing the final product steel's characteristics. Some embodiments of the present invention solve the problem of having to use less economical reducing agents and preheating oxide materials to avoid the formation of unwanted by-products.

Some embodiments provide an operational control at the end of the process that allows chemical composition control over silicon, manganese, and carbon when using an electric converter.

Figure 1:
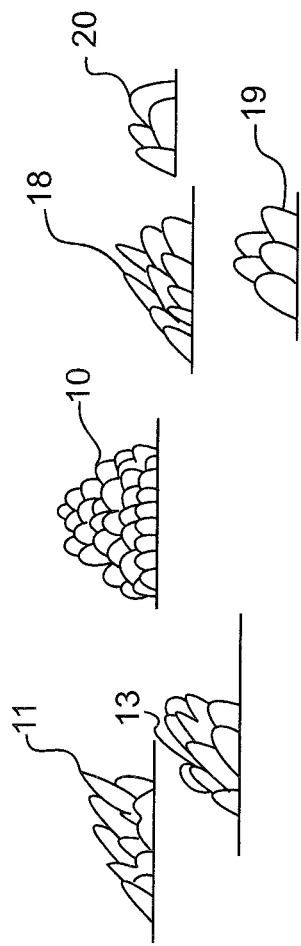
FIG. 1 is a side view illustrating iron ore or scrap iron, slag forming materials, manganese ore or source materials, reducers, and alloying materials that may be used according to a preferred embodiment of the invention.

As illustrated in FIGS. 1 and 2, in some embodiments of the invention, slag forming materials 11,13, manganese containing oxide materials 18, and a reducer or reducers 19 are added to an iron majority containing mixture 14. The resulting mixture is then heated in a furnace 22 to allow the oxide materials to be reduced. The initial iron majority mixture 14 may be prepared according to any number of methods commonly known. The resulting mixture 24 is then heated to allow the oxide materials 18 to be reduced and alloyed with the iron majority mixture 14. The slag 28, or impurities, from this reaction are then removed to reveal the manganese alloyed steel 26. If an electric converter furnace 22 is used, an additional measure of control is available for carbon, iron, silicon, and manganese content in the final product chemical composition.

Addition of the materials 11,13,18,19, 20 to the iron majority mixture 14 can come in several steps or all at once. Ideally, the materials 11,13,18,19, 20 are added to the iron majority mixture 14 when a heat source is available or soon to follow to compensate for the heat loss due to the endothermic reactions occurring, as steel characteristics can be adversely affected by inadvertent cooling.

Figure 4:
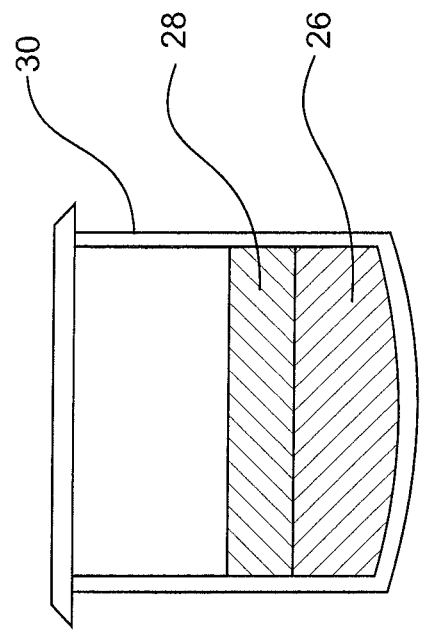
FIG. 4 is a schematic cutaway side view of a ladle.

The amounts of the slag forming materials 11,13 reducer or reducers 19, and oxide materials 18 added to the iron majority containing mixture 14 depend upon the desired preset chemical composition of the final product. FIG. 4 shows a ladle 30 containing steel 26 and slag 28. The ladle may have removed the steel 26 and slag 28 from the electric furnace 22.

Although there will be a loss of material due to loss through the slag 16, 28 (See FIG. 4) volume, the reducer or reducers 19, oxide materials 18, and slag forming materials 11, 13 used for alloying can be added to the iron majority containing mixture 14 in the heating instrument used for iron production, or refinement, if the invention is used at an integrated steel production facility.

The reducer/s 19 used can be either silicon or a combination of carbon and silicon. If carbon and silicon are used as reducers 19, they can be added at the same time but are ideally added sequentially. Ideally, when silicon alone is not feasible to use, a carbon based reducer 19 would be added to the iron majority mixture 14 and allowed to partially reduce, after the oxide material 18 and slag forming materials 11, 13 are added to the iron majority containing mixture 14. After the carbon reducer 19 has partially reduced the oxide materials 18, a silicon reducer 19 would be added to complete the reduction process.

Using carbon as a reducer 19 will depend upon the feasibility of carbon and silicon economically and of the final chemical composition required for the steel.

The slag forming materials 11,13 can be any of calcium oxide, magnesium oxide, manganese oxide, and barium oxide forms, these usually being found in dolomite and limestone. This allows for more effective use of silicon as a reducer 19 so that the final steel composition 26 (see FIG. 4) does not contain high amounts of silicon.

By effectively using silicon as a reducer 19 in the lowest amounts possible it is possible to alloy with oxides 18 without the formation of large amounts of nonmetal inclusions. As silicon use is increased, slag 16 volume of the reaction will increase requiring more material to be used and the likelihood of non-metal inclusions to increase. Although using more silicon as a reducer 19 can lead to improved extraction rates from the oxide material 18, this can affect the final product 26 (see FIG. 4) composition.

The amounts of the reducer/s 19, oxide materials 18, and slag forming materials 11, 13 used can vary based upon the final steel composition desired and if amounts of any of the proceeding compounds occur as by products of other reactions in this process or if they are introduced for other reasons, including alloying with other materials or oxides other than manganese.

The amount of heat required for the reaction to occur successfully is around 1430° C. or above. The exact temperature may vary depending upon many things including furnace type and size as well as the grade and size of materials used. The reduction reaction temperature is beneficial because it is below the normal production temperature of pig and sponge iron, if necessary allowing the reaction to occur in an iron reduction furnace after iron reduction has occurred. It also allows for no additional heat to be used for the reaction in any furnace beyond the heating of the materials 11,13,18,19, 20 used for alloying as the iron containing product 14 will not have to be brought up to the temperature of the alloying materials 11,13,18,19, 20 as it is already exceeding this temperature.

Figure 3:
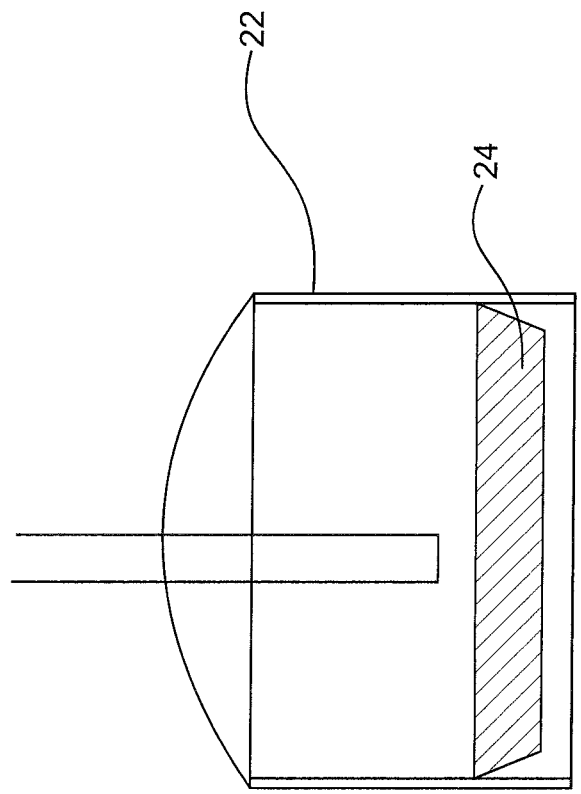
FIG. 3 is a schematic cutaway side view of another furnace that may be used in some embodiments of the invention.

It is ideal that the alloying reaction occur at the same temperature as the iron majority containing mixture 14 is when it is produced so that cooling does not adversely affect the characteristics of the steel as long as the temperature is above the 1430° C. used for the alloying reaction of oxides containing manganese. If a converter furnace 22 as shown in FIG. 3 is used as the final step in the alloying process another measure of control is available upon the final chemical composition of the steel. In addition to changing the amount of oxide material 20, carbon, silicon, and slag forming materials 13 the resistance of the converter operation can alter the composition of the final steel product 26.

This can be done by changing the type of electrode paste used to that of a different resistance, electrode penetration depth, or other means of furnace operation. One of ordinary skill in the art after reviewing this disclosure will understand how to alter the various factors to achieve a desired steel product 26.

By decreasing the resistance, and keeping the raw material amounts the same, in the converter 22 it increases the manganese composition in the metal 26 while decreasing the silicon content in the metal 26. This increases the silicon composition in the slag 28 and decreases the manganese composition in the slag 28. By increasing the resistance in the converter 22, and keeping the raw material amounts the same, it decreases the manganese composition in the metal 26 while increasing the silicon content in the metal 26. This decreases the silicon composition in the slag 28 and increases the manganese composition in the slag 28. By using both operational changes and raw material mixture changes carbon, silicon, iron, and manganese content in the final product 26 can be controlled without sacrificing manganese recovery rates or the amount of non-metal inclusions.

The methods described herein can be used to produce various grades of steel alloyed with manganese. The various embodiments of the invention cover all current applications with manganese concentration of the final product 26 ranging between 0.20 and 8 percent by mass. The various embodiments of the invention work beyond these mass limits but within these limits there is greater certainty of excluding nonmetallic inclusions. Although the methods described herein work with other furnace types, it is most efficient using an electric converter furnace 22 in the final reaction step.

Returning to FIGS. 1 and 2, a detailed explain of a method in accordance with the invention will now be described. As with most all steel making processes, initially a raw source of iron 10 is smelted producing an iron majority containing compound 14. This could be considered either a sponge iron component or a pig iron. The method of producing the iron majority containing compound 14 may be done conventionally and can vary based upon the facility's preferences.

At an integrated facility where the iron majority containing compound 14 is produced on the same site as the alloying occurs, use can be made of the iron refinement heat to partially react the oxide materials 18, reducer/s 19, and slag forming materials 11.

During production of the iron majority containing compound 14, the alloying oxide material 18, slag forming materials 11, and reducer 19 can be added. Addition of the manganese alloying materials 11,13,18,19, 20 is preferably to happen after the iron majority compound 14 has been refined. The addition of such materials 11,13,18,19, 20 is preferred to only occur if the heat required for the reaction does not alter the iron majority containing compound 14 and stays above the required heat for the alloying to occur successfully, 1430° C. At integrated facilities, the ordering of the raw materials is preferential to occur in the same order as described for non-integrated facilities.

At non-integrated facilities or where preference is not to use the heat of the iron refinement facility the alloying materials 11,13,18,19, 20 are added into the final furnace or converter 22. In some embodiments, the final furnace 22 may be an electric furnace 22. This is because an electric furnace 22 may be more precisely controlled. In embodiments where a first furnace 12 such as gas furnace is used to initially provide heat the iron product 14 may be moved to a second furnace 22. This moving may be done with a ladle or any other suitable method. Once moved, or in the final state of control, the iron product is referenced with reference number 24.

When adding the raw materials to the converter or final furnace 22 the order of addition can affect the resulting product and the amount of raw materials used.

The addition of alloying materials 11,13,18,19, 20 to the converter 22 can occur either at the same time or after the iron majority containing compound 24 has been added. The addition of alloying materials 11,13,18,19, 20 is preferably to begin when the converter 22 is at least half filled with the iron majority containing compound 24 to contain the reaction.

If alloying materials 11,13,18,19, 20 are added to the converter 22 at the same time as the iron majority containing compound 24, it is preferential that only the oxide material 18 and slag forming materials 13 are added at this time until the full volume of the iron majority containing compound 24 is added to the converter 22. Once the full volume of the iron containing compound 24 is added to the converter 22 the reducer/s 19 can be added for the reaction to precede.

If using carbon and silicon reducing agents, the carbon is ideally added first to the mixture 24 and allowed to partially reduce. The time that the carbon is allowed to reduce depends upon a preset chemical composition set by the producer. Next the silicon reducing agent 19 is added and the mixture 24 is allowed to react until desired completion. Once operational control has been taken and the reaction has completed to the desired effect, this will depend upon time constraints and desired chemical composition, the mixture 24 can continue to be alloyed, processed, uniformed, or tapped and the slag 28 removed. If only silicon and no carbon is to be used as the reducing agent 19 then the carbon introduction is skipped and the silicon is allowed to react until completion initially.

If alloying materials 11,13,18,19, 20 are not added when the iron majority containing compound 24 is transferred to the converter 22, they can be added once the iron majority containing compound 24 has been fully transferred to the converter 22. In this case, once the iron majority containing compound 24 has been added the reducer/s 19, slag forming materials 13, and oxide materials 18 can be added in any order or all at once but are not used effectively when added all at once or in random order. In order to use the reducer/s 19 effectively and limit the amount of non-metallic inclusions they are better ordered. First the oxide material 18 and slag forming materials 13 are added to the iron majority containing compound 24 in the converter 22.

If using carbon and silicon reducing agents 19, the carbon is ideally added first to the mixture 24 and allowed to partially reduce. The time that the carbon is allowed to reduce depends upon a preset chemical composition set by the producer. Next the silicon reducing agent is added and the mixture 24 is allowed to react until desired completion. Once operational control has been taken and the reaction has completed to the desired effect, this will depend upon time constraints and desired chemical composition, the mixture 24 can continue to be alloyed, processed, uniformed, or tapped and the slag 28 removed.

If only silicon and no carbon is to be used as the reducing agent 19 then the carbon introduction is skipped and the silicon is allowed to react until completion initially.

By ordering the introduction of the oxide material 18, slag forming materials 13 and reducer/s 19 it is possible to use as small of an amount as possible of the reducer 19, thus conserving the reducer 19. If the reaction is required to proceed in a quicker time, more reducer 19 can be used but this affects the amount of non-metallic inclusions, affecting the final characteristics of the steel 26. If no excess reducer 19 is used the steel 26 is enhanced by having as few non-metallic inclusions as possible. This greatly enhances the surface characteristics of the final product 26, allowing for better usability and widening the use of the steel 26.

In both the integrated and non-integrated processes the amounts of the raw materials used for alloying will depend upon the final desired chemical composition of the steel 26 as well as if any of the raw material forms used produce byproducts that affect the reaction. The amounts of raw materials can also be chosen to accommodate time restrictions, as well as to conserve the reducer/s 19 and/or oxide materials 18.

Operational control of the mixture 24 involves varying the heat and resistance of the mixture 24 in the converter 22 once the iron majority containing compound 14, reducer/s 19, slag forming materials 13, and oxide materials 18 are added to the converter 22. Varying the heat can alter the time the reaction takes to occur as well as possibly the chemical composition or structure of the final product 26 if not accounted for initially.

Varying the resistance of the reaction occurring in the converter 22 will alter the chemical composition of the final steel 26 as well as possibly alter the time it takes the reaction to occur. This can be done by changing the type of electrode paste used to that of a different resistance, electrode penetration depth, or other means of furnace operation.

By decreasing the resistance and keeping the raw material amounts the same in the converter 22, the manganese composition is increased in the metal 26 while decreasing the silicon content in the metal 26. This increases the silicon composition in the slag 28 and decreases the manganese composition in the slag 28. By increasing the resistance in the converter 22, and keeping the raw material amounts the same, the manganese composition is decreased in the metal 26 while increasing the silicon content in the metal 26. This decreases the silicon composition in the slag 28 and increases the manganese composition in the slag 28. By using both operational changes and raw material mixture changes, the carbon, silicon, iron, and manganese content in the final product 26 can be controlled without sacrificing manganese recovery rates or the amount of non-metal inclusions.

The alloying process described herein can occur while other alloying processes occur but should be noted that the effective use of raw materials may be compromised as well as the quality of the final steel 26 i.e. the amount of non-metallic inclusions may change. It should also be noted that when simultaneous alloying occurs there may be overlap within the raw materials used and the amounts of raw materials may need to be compensated.

Figure 5:
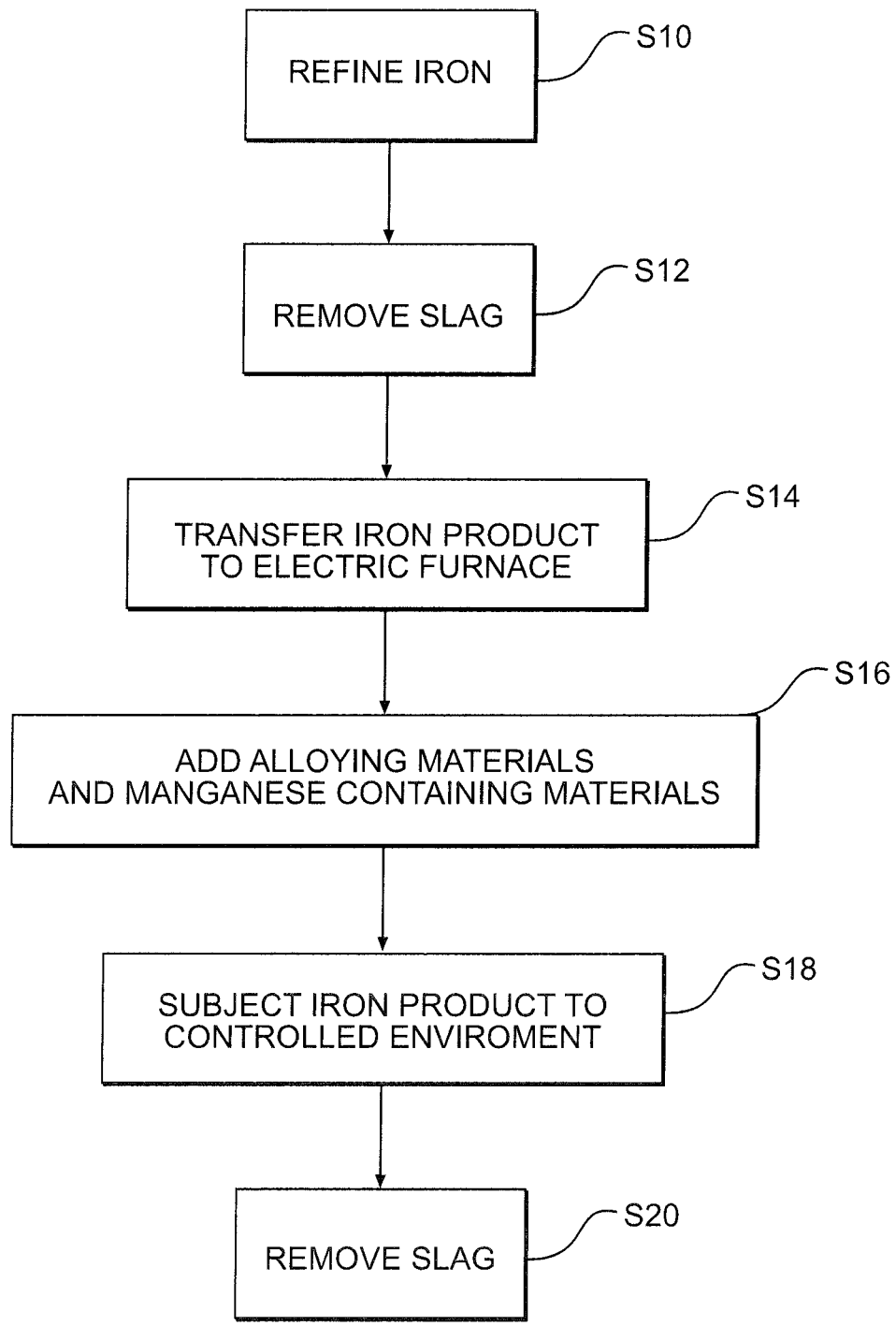
FIG. 5 is a flow chart showing steps that may be taken in one embodiment of the invention.
Figure 6:
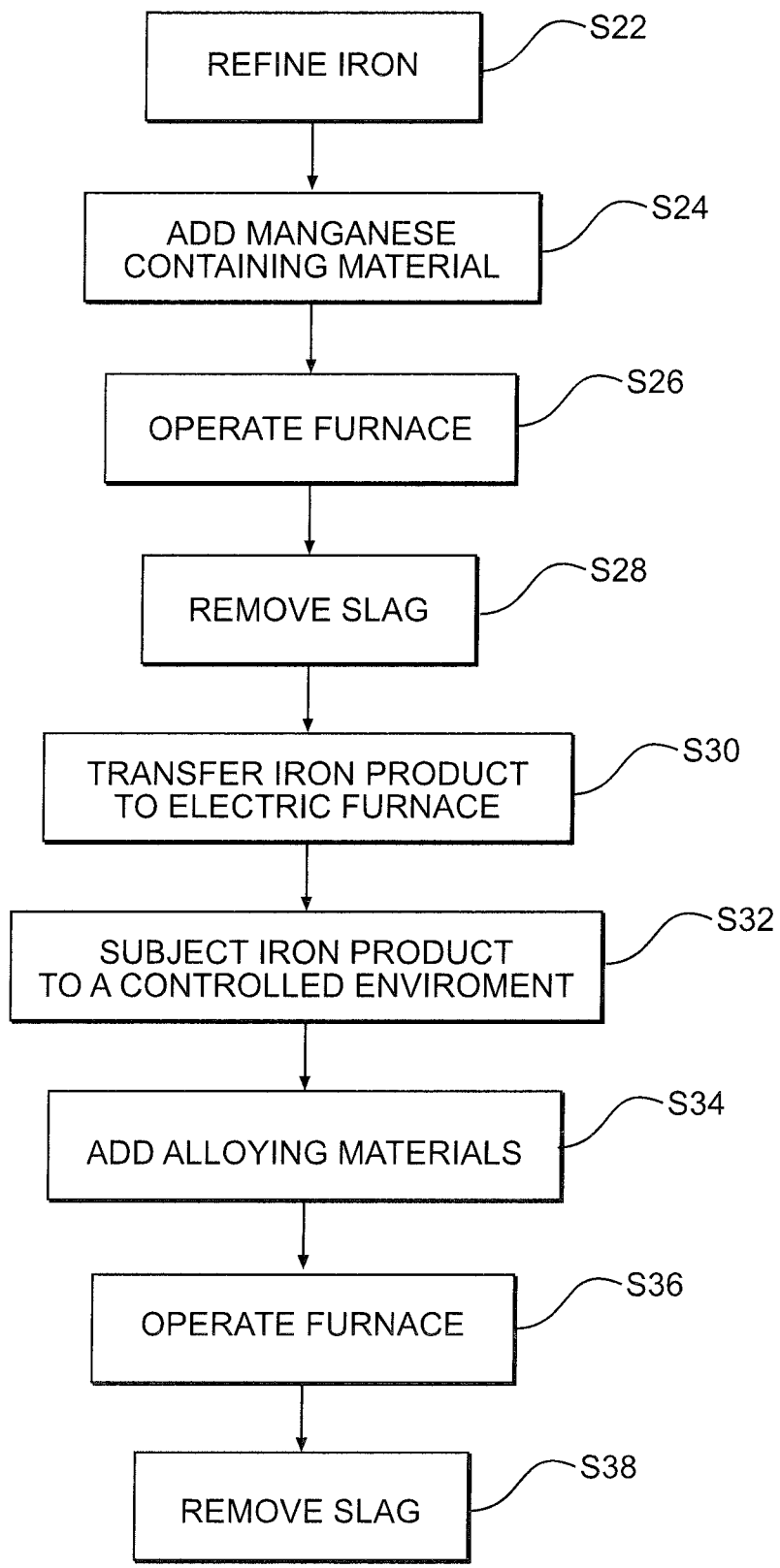
FIG. 6 is a flow chart showing steps that may be taken in one embodiment of the invention.
Figure 7:
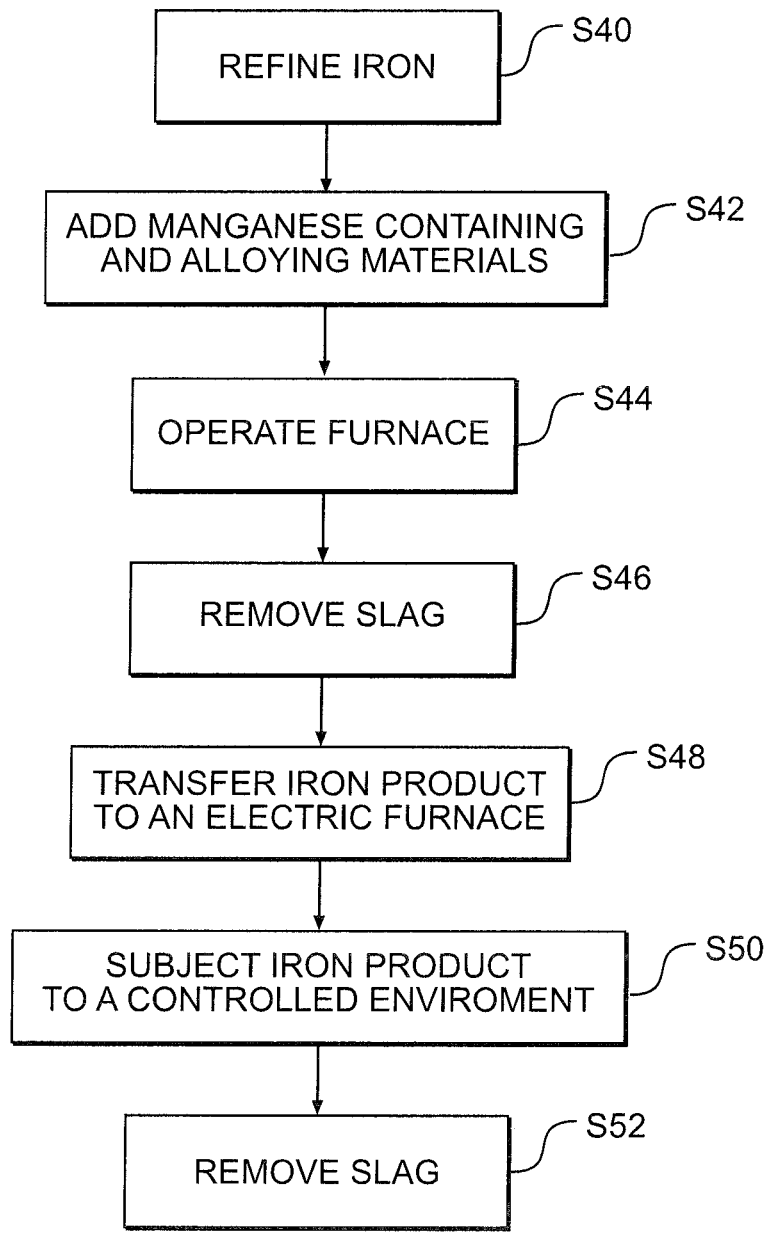
FIG. 7 a flow chart showing steps that may be taken in one embodiment of the invention.

The methods described above may be summarized in the flow charts shown in FIGS. 5-7. In FIG. 5 with reference to the reference numbers used in FIGS. 1-4, the iron 14 is refined in any type of furnace 12 using a conventional or any suitable manner at step S10. At step S12, the slag 16 is removed. At step S14, the iron product 14 is transferred to an electric furnace 22. In step S16, the alloying materials 11,13,19,20 and manganese containing material or oxides 18 are added to the mixture 24. At step S18, the iron product 24 is subject to the various heat and time controls described above. As described above steps S14, S16 and S18 are not necessarily done in sequential order or the order set forth in FIG. 5. At step S20 the slag 28 is removed.

FIG. 6 shows an alternate method in accordance with another embodiment of the invention. In FIG. 6, with reference to the reference numbers used in FIGS. 1-4, the iron 14 is refined in any type of furnace 12 using a conventional or any suitable manner at step S22. At step S24, the manganese containing material 18 is added to the iron product 14. The furnace 12 is operated at step S26. At step S28, the slag 16 is removed. At step S30, the iron product 14 is transferred to an electric furnace 22. In step S32, the iron product 24 is subject to a controlled environment such as the various heat and time controls described above. At step S18, the alloying materials 11,13,18,19, 20 are added to the mixture 24. The furnace 22 is continued to be operated at step S36. At step S38 the slag 28 is removed. The steps set forth in FIG. 6 are not necessarily done in sequential order or the order set forth in FIG. 6.

FIG. 7 shows an alternate method in accordance with another embodiment of the invention. In FIG. 7, with reference to the reference numbers used in FIGS. 1-4, the iron 14 is refined in any type of furnace 12 using a conventional or any suitable manner at step S40. At step S42, the manganese containing material 18 and alloying materials 11,13,19, 20 are added to the iron product 14. The furnace 12 is operated at step S44. At step S46, the slag 16 is removed. At step S48, the iron product 14 is transferred to an electric furnace 22. In step S50, the iron product 24 is subject to a controlled environment such as the various heat and time controls described above. At step S50 the slag 28 is removed. The steps set forth in FIG. 7 are not necessarily done in sequential order or the order set forth in FIG. 7.

It will be appreciated that there are some embodiments where all of the processes to obtain a desired end product 26 can be accomplished in the original furnace 12. As such, in such embodiments, the step of transferring the iron product to an electric furnace 22 will be omitted, and the processed described to be accomplished in a second furnace 22 may be accomplished in the original furnace 12.

The following examples set forth additional detail to achieve a desired final steel product 26. The examples are done according to the methods set forth herein. Generally speaking, examples 1-8 correspond to the method described in FIG. 5, examples 9-10 correspond to the method described in FIG. 6, and examples 11-12 correspond to the method described in FIG. 7.

EXAMPLE 1

Production of General Purpose Steel with a 3% Final Manganese Composition Using Slag Forming Materials, Reducers, Manganese Containing Ore, and a Carbon Source, All to be Added to the Iron Majority Mixture After Refinement The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the refined iron majority compound is produced, it was transferred by ladle to the converter, which can be oxygen or other gas. As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

A slag-forming material was made of dolomite with the following chemical composition, mass %: 0.08 BaO; 45.52 CaO; 16.63 MgO; 3.51 MnO. It should also be noted that the dolomite contained a 15.31% $SiO_2$ content which is accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound was prepared in the converter, the manganese containing ore, carbon source, slag-forming materials and reducer are introduced into the converter in the following percentages based on the final total mass of the steel produced with a manganese extraction rate of 92.2%, mass %: 3.25 Mn, 1.94 $SiO_2$, 0.55 slag forming materials, 1.46 C. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430 C was achieved. During the conversion process the resistance was controlled as previously described to control the final steel composition. The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metallic inclusions and resulted in a better extraction rate when compared to current ferroalloy use.

EXAMPLE 2

Production of General Purpose Steel with a 5% Final Manganese Composition Using Slag Forming Materials, Reducers, manganese containing ore, and a Carbon Source, All to be Added to the Iron Majority Mixture After Refinement The method of producing general purpose steel was accomplished using an iron majority compound that can be produced in any ways of refinement, converter, open-hearth, blast, and electrical. The iron majority compound has a preset chemical composition with the carbon content preset to allow for later use of carbon in the alloying process without altering the final chemical composition desired.

Once the refined iron majority compound is produced it was transferred by ladle to the converter, which can be oxygen or other gas.

As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

A slag-forming material use was made of dolomite with the following chemical composition, mass %: 0.08 BaO; 45.52 CaO; 16.63 MgO; 3.51 MnO. It should also be noted that the dolomite contained a 15.31% $SiO_2$ content which is accounted for as a reducer. Use was also made of the slag producing material in the other compounds listed.

A reducer was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound was prepared in the converter the manganese containing ore, carbon source, slag-forming materials and reducer are introduced into the converter in the following percentages based on the final total mass of the steel produced with a manganese extraction rate of 92.2%, mass %: 5.42 Mn, 3.28 $SiO_2$, 0.92 slag forming materials, 2.44 C. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430° C. was achieved. During the conversion process the resistance was controlled as previously described in the invention to control the final steel composition. The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metallic inclusions and resulted in a better extraction rate when compared to current ferroalloy use.

EXAMPLE 3

Production of General Purpose Steel with a 3% Final Manganese Composition Using a Reducer and Manganese Containing Ore All to be Added to the Iron Majority Mixture after Refinement The method of producing general purpose steel was accomplished using an iron majority compound that can be produced in any ways of refinement, converter, open-hearth, blast, and electrical. The iron majority compound has a preset chemical composition with the carbon content preset to allow for later use of carbon in the alloying process without altering the final chemical composition desired. Once the refined iron majority compound is produced it was transferred by ladle to the converter, which can be oxygen or other gas.

As a manganese containing oxide material use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As a reducer use was made of quartzite with the following chemical composition, mass %: 0.09 $TiO_2$; 98.88 $SiO_2$; 0.30 FeO; 0.08 CaO.

Once the iron majority compound was prepared in the converter the manganese containing ore and reducer are introduced into the converter in the following percentages based on the final total mass of the steel produced with a Manganese extraction rate of 86.1%, mass %: 3.48 Mn, 2.77 $SiO_2$. It is also possible to have the materials needed to accomplish manganese alloying in the converter previous to the iron majority compound but it could interfere with the preparation of the iron majority compound. After the preparation of the iron majority compound and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was characterized by a higher amount of non-metal inclusions and surface defects in quality due to the lack of use of slag forming materials.

EXAMPLE 4

Production of General Purpose Steel with a 5% Final Manganese Composition Using a Reducer and Manganese Containing Ore All to be Added to the Iron Majority Mixture After Refinement The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the refined iron majority compound is produced it was transferred by ladle to the converter, which can be oxygen or other gas. As a manganese containing oxide material use was made of manganese containing ore with the following chemical composition, mass %: 50.72 Mn; 0.98 MgO; 1.29

FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As a reducer use was made of quartzite with the following chemical composition, mass %: 0.09 $TiO_2$; 98.88 $SiO_2$; 0.30 FeO; 0.08 CaO.

Once the iron majority compound was prepared in the converter the manganese containing ore and reducer are introduced into the converter in the following percentages based on the final total mass of the steel produced with a manganese extraction rate of 86.1%, mass %: 5.81 Mn, 4.61 $SiO_2$. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved. The steel produced was suitable for casting, rolling, forming, or other steel uses. The metal produced was characterized by a higher amount of non-metal inclusions and surface defects in quality due to the lack of use of slag forming materials.

EXAMPLE 5

Production of General Purpose Steel with a 3% Final Manganese Composition Using Reducers, Manganese Containing Ore, and a Carbon Source, All to be Added to the Iron Majority Mixture After Refinement The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired. Once the refined iron majority compound is produced it was transferred by ladle to the converter, which can be oxygen or other gas.

As a manganese containing oxide material use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, Less than 1% mass and a water content of fewer than 3.25% mass.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound was prepared in the converter the manganese containing ore, carbon source, and reducer are introduced into the converter in the following percentages based on the final total mass of the steel produced with a manganese extraction rate of 82.7%, mass %: 3.63 Mn, 2.47 $SiO_2$, 1.63 C. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved. The steel produced was suitable for casting, rolling, forming, or other steel uses. The metal produced was characterized by a higher amount of non-metal inclusions and surface defects in quality due to the lack of use of slag forming materials.

EXAMPLE 6

Production of General Purpose Steel with a 5% Final Manganese Composition Using Reducers, Manganese Containing Ore, and a Carbon Source, All to be Added to the Iron Majority Mixture After Refinement The method of producing-general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired. Once the refined iron majority compound is produced it was transferred by ladle to the converter, which can be oxygen or other gas.

As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound was prepared in the converter the manganese containing ore, carbon source, and reducer are introduced into the converter in the following percentages based on the final total mass of the steel produced with a manganese extraction rate of 82.7%, mass %: 6.05 Mn, 4.12 $SiO_2$, 2.72 C. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was characterized by a higher amount of non-metal inclusions and surface defects in quality due to the lack of use of slag forming materials.

EXAMPLE 7

Production of General Purpose Steel with a 3% Final Manganese Composition Using Slag Forming Materials, a Reducer, and Manganese Containing Ore, All to be Added to the Iron Majority Mixture After Refinement The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the refined iron majority compound is produced it was transferred by ladle to the converter, which can be oxygen or other gas. As a manganese containing oxide material use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

A slag-forming material was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO.

Once the iron majority compound was prepared in the converter the manganese containing ore, slag-forming compounds and reducer are introduced into the converter in the following percentages based on the final total mass of the steel produced with a manganese extraction rate of 94.6%, mass %: 3.17 Mn, 2.25 $SiO_2$, 0.54 slag forming compounds. It is also possible to have the materials needed to accomplish manganese alloying in the converter previous to the iron majority compound but it could interfere with the preparation of the iron majority compound. After the preparation of the iron majority compound and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metallic inclusions and resulted in a better extraction rate when compared to current ferroalloy use.

EXAMPLE 8

Production of General Purpose Steel with a 5% Final Manganese Composition Using Slag Forming Materials, a Reducer, and Manganese Containing Ore, All to be Added to the Iron Majority Mixture After Refinement The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the refined iron majority compound is produced it was transferred by ladle to the converter, which can be oxygen or other gas.

As a manganese containing oxide material use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As slag-forming material use was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO.

Once the iron majority compound was prepared in the converter the manganese containing ore, slag-forming materials and reducer are introduced into the converter in the following percentages based on the final total mass of the steel produced with a manganese extraction rate of 94.6%, mass %: 5.29 Mn, 3.75 $SiO_2$, 0.90 slag forming compounds. It is also possible to have the materials needed to accomplish manganese alloying in the converter previous to the iron majority compound but it could interfere with the preparation of the iron majority compound.

After the preparation of the iron majority compound and the alloying compounds in the converter a temperature of at least 1430° C. was achieved. During the conversion process the resistance was controlled as previously described in the invention to control the final steel composition. The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses.

The metal produced was free of high amounts of non-metallic inclusions and resulted in a better extraction rate when compared to current ferroalloy use.

EXAMPLE 9

Production of General Purpose Steel with a 3% Final Manganese Composition Using Slag Forming Materials, Reducers, Manganese Containing Ore, and a Carbon Source with the Ore Being Heated in the Iron Refinement Furnace The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the iron majority compound was produced, the manganese containing ore was added while the iron was still in the refinement furnace. The amount of manganese added was 4.15 percent mass of the final steel produced. The furnace was then brought back up to the iron refining temperature. It should be noted that this temperature is usually exceeding the 1430° C. required for the manganese reaction. It should be noted that the manganese containing ore could be added to the furnace before the iron is refined or completely refined but could interfere with the iron refinement. If the manganese containing ore was added before iron refinement it would still be heated with the same volume.

After being reheated the iron majority compound containing the heated manganese was tapped into a ladle to be transferred to the converter and the slag was removed.

A manganese containing oxide material was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

A slag-forming material was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound containing the manganese was prepared in the converter the carbon source, slag-forming materials and reducer are introduced into the converter in the following-percentages based on the final total mass of the steel produced with a manganese extraction rate of 72.3%, mass %: 1.95 $SiO_2$, 1.46 C, 0.55 slag forming materials. It should be noted that it is possible to have the materials needed to accomplish manganese alloying in the converter previous to the iron majority compound containing the manganese being added but it could interfere with the preparation of the iron majority compound.

After the preparation of the iron majority compound containing manganese and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metal inclusions.

EXAMPLE 10

Production of General Purpose Steel with a 5% Final Manganese Composition Using Slag Forming Materials, Reducers, Manganese Containing Ore, and a Carbon Source with the Ore Being Heated in the Iron Refinement Furnace.

The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the iron majority compound was produced, the manganese containing ore was added while the iron was still in the refinement furnace. The amount of manganese added was 6.92 percent mass of the final steel produced. The furnace was then brought back up to the iron refining temperature. It should be noted that this temperature is usually exceeding the 1430° C. required for the manganese reaction. It should be noted that the manganese containing ore could be added to the furnace before the iron is refined or completely refined but could interfere with the iron refinement. If the manganese containing ore was added before iron refinement it would still be heated with the same volume.

After being reheated the iron majority compound containing the heated manganese was tapped into a ladle to be transferred to the converter and the slag was removed.

As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As slag-forming material use was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

Once the iron majority compound containing the manganese was prepared in the converter the carbon source, slag-forming materials and reducer are introduced into the converter in the following percentages based on the final total mass of the steel produced with a manganese extraction rate of 72.3%, mass %: 3.28 $SiO_2$, 2.44 C, 0.92 slag forming materials. It should be noted that it is possible to have the materials needed to accomplish manganese alloying in the converter previous to the iron majority compound containing the manganese being added but it could interfere with the preparation of the iron majority compound.

After the preparation of the iron majority compound containing manganese and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metal inclusions.

EXAMPLE 11

Production of General Purpose Steel with a 3% Final Manganese Composition Using Slag Forming Materials, Reducers, Manganese Containing Ore, and a Carbon Source with All Being Heated in the Iron Refinement Furnace.

The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the iron majority compound was produced, the manganese containing ore, reducer, carbon source, and slag forming materials were added while the iron was still in the refinement furnace in the following percentages based on the final steel produced with a manganese extraction rate of 64.8%, mass %: 4.63 Mn, 2.76 $SiO_2$, 2.08 C, 0.79 slag forming materials. The furnace was then brought back up to the iron refining temperature. It should be noted that this temperature is usually exceeding the 1430° C. required for the manganese reaction. It should be noted that the alloying materials could be added to the furnace before the iron is refined or completely refined but could interfere with the iron refinement. If the alloying materials were added before iron refinement it would still be heated with the same volume.

After being reheated the iron majority compound containing the heated manganese and alloying materials was tapped into a ladle to be transferred to the converter and the slag was removed.

As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

As slag-forming material use was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

After the preparation of the iron majority compound containing manganese and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metal inclusions.

EXAMPLE 12

Production of General Purpose Steel with a 5% Final Manganese Composition Using Slag Forming Materials, Reducers, Manganese Containing Ore, and a Carbon Source with All Being Heated in the Iron Refinement Furnace The method of producing general purpose steel was accomplished using an iron majority compound that can be produced in any way of refinement, converter, open-hearth, blast, and electrical. The iron majority compound has a preset chemical composition with the carbon content preset to allow for later use of carbon in the alloying process without altering the final chemical composition desired.

Once the iron majority compound was produced, the manganese containing ore, reducer, carbon source, and slag forming materials were added while the iron was still in the refinement furnace in the following percentages based on the final steel produced with a manganese extraction rate of 64.8%, mass %: 7.72 Mn, 4.61 $SiO_2$, 3.47 C, 1.32 slag forming materials. The furnace was then brought back up to the iron refining temperature. It should be noted that this temperature is usually exceeding the 1430° C. required for the manganese reaction. It should be noted that the alloying materials could be added to the furnace before the iron is refined or completely refined but could interfere with the iron refinement. If the alloying materials were added before iron refinement it would still be heated with the same volume.

After being reheated the iron majority compound containing the heated manganese and alloying materials was tapped into a ladle to be transferred to the converter and the slag was removed.

As a manganese containing oxide material, use was made of manganese containing ore with the following chemical composition, mass %: 50.72 Mn; 0.98 MgO; 1.29 FeO; 0.9 CaO; 4.28 BaO; 0.67 $Al_2O_3$; 0.06 $P_2O_5$; 7.15 $SiO_2$. Notably, the ore had a low phosphorus amount, less than 1% mass and a water content of fewer than 3.25% mass.

A slag-forming material use was made of dolomite with the following chemical composition, mass %: 0.08 BaO; 45.52 CaO; 16.63 MgO; 3.51 MnO. It should also be noted that the dolomite contained a 15.31% $SiO_2$ content which must be accounted for as a reducer. Use was also made of the slag producing material in the other compounds listed.

As a reducer use was made of quartzite with the following chemical composition, mass %: 0.09 $TiO_2$; 98.88 $SiO_2$; 0.30 FeO; 0.08 CaO. Silicon is the main reducer employed but carbon was also used as a reducer in the form of coke.

After the preparation of the iron majority compound containing manganese and the alloying compounds in the converter a temperature of at least 1430° C. was achieved. During the conversion process the resistance was controlled as previously described in the invention to control the final steel composition.

The alloyed metal product and resulting slag volume were tapped into a ladle lined with refractory material and the slag volume was discarded. The alloying process was finished when the appropriate degree of extraction from the ore was achieved.

The steel produced was suitable for casting, rolling, forming, or other steel uses. The metal produced was free of high amounts of non-metal inclusions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of alloying an iron majority compound with an oxide comprising:
   heating the iron majority compound to a molten state;
   adding an oxide containing manganese to the molten iron majority compound;
   adding slag forming material to the molten iron majority compound;
   controlling the iron majority compound to achieve a desired temperature for a desired period of time; and
   removing slag from the iron majority compound,
   wherein the chemical composition of the iron majority compound is altered by changing a resistance of a converter operation, and
   wherein material containing manganese added to the molten iron majority compound does not contain manganese ferroalloys.

2. The method of claim 1, further comprising adding a reducer to the iron majority compound.

3. The method of claim 1, further comprising reducing iron and manganese together in a common container at the same time.

4. The method of claim 3, wherein the iron is reduced from one of an iron ore and scrap iron and the manganese is reduced from one of manganese ore and a manganese containing material.

5. The method of claim 1, further comprising reducing iron and manganese in a common container wherein the iron is reduced and slag is removed then a manganese containing material is added to the iron, the manganese is reduced and slag is removed.

6. The method of claim 1, wherein the iron majority compound is controlled in an electronic furnace.

7. The method of claim 1, wherein the chemical composition of the iron majority compound is altered by adding multiple reducing agents.

8. A method of alloying iron and manganese comprising:
heating iron containing material to form molten iron;
adding manganese containing materials to the molten iron to form a mixture
wherein the manganese containing materials include manganese oxide, wherein the manganese containing materials do not contain manganese ferroalloys;
utilizing an electric converter to control a chemical composition of the mixture by changing a resistance of the electric converter;
continuing to heat the mixture;
removing slag from the mixture;
subjecting the mixture to a controlled heating environment; and
removing slag from the mixture.

9. The method of claim 8, further comprising transferring the mixture to an electric furnace.

10. The method of claim 8, adding alloying materials to the mixture.

11. The method of claim 8, adding slag forming material to the mixture.

12. The method of claim 8, further comprising:
adding alloying material to the molten iron;
adding slag forming materials to the molten iron;
wherein the slag forming material and the alloying materials are added with the manganese containing materials.

* * * * *

UNITED STATES PATENT AND TRADEMARK OFFICE
CERTIFICATE OF CORRECTION

| | | |
|---|---|---|
| PATENT NO. | : 8,641,800 B2 | Page 1 of 1 |
| APPLICATION NO. | : 13/169696 | |
| DATED | : February 4, 2014 | |
| INVENTOR(S) | : Joseph Boston McMahan | |

It is certified that error appears in the above-identified patent and that said Letters Patent is hereby corrected as shown below:

Title Page, Item (12) change "McMahon" to --McMahan--.

Title Page, please change Item (75) the Inventor's name from "Joseph Boston McMahon" to --Joseph Boston McMahan,--.

Signed and Sealed this
Third Day of June, 2014

Michelle K. Lee
*Deputy Director of the United States Patent and Trademark Office*